United States Patent [19]

Burr et al.

[11] Patent Number: 4,491,428
[45] Date of Patent: Jan. 1, 1985

[54] EARTH BORING DRILL BIT WITH SNAP RING CUTTER RETENTION

[75] Inventors: Bruce H. Burr, Harris; George E. Dolezal; Edward M. Galle, both of Galveston, all of Tex.

[73] Assignee: Hughes Tool Company, Houston, Tex.

[21] Appl. No.: 325,608

[22] Filed: Nov. 27, 1981

Related U.S. Application Data

[60] Division of Ser. No. 174,483, Aug. 1, 1980, Pat. No. 4,344,658, which is a continuation of Ser. No. 8,504, Feb. 1, 1979, abandoned, which is a continuation of Ser. No. 846,643, Oct. 28, 1977, abandoned.

[51] Int. Cl.³ .................. F16C 17/10; F16C 43/02
[52] U.S. Cl. ............................... 384/93; 384/96
[58] Field of Search .............. 308/8.2, 36.1, 36.2, 308/187, DIG. 11; 175/228, 369, 371; 384/93, 96

[56] References Cited

U.S. PATENT DOCUMENTS

| | | | |
|---|---|---|---|
| 3,620,580 | 11/1971 | Cunningham | 308/8.2 |
| 3,935,911 | 2/1976 | McQueen | 308/8.2 |
| 4,344,658 | 8/1982 | Ledgerwood | 384/96 |

Primary Examiner—Lenard A. Footland
Attorney, Agent, or Firm—Robert A. Felsman

[57] ABSTRACT

Disclosed herein is an earth boring bit of otherwise conventional construction except for the bearing and cutter retention. A snap ring is used to retain the cutter, the grooves that receive the ring and the ring construction being such that the ring is forced into the retainer groove when the cone is thrust inward. The ring cannot therefor accidentally return to its assembly position to permit cutter loss. This enables the use of exclusively frictional bearings and retainer means of exceptional strength and reliability.

9 Claims, 7 Drawing Figures

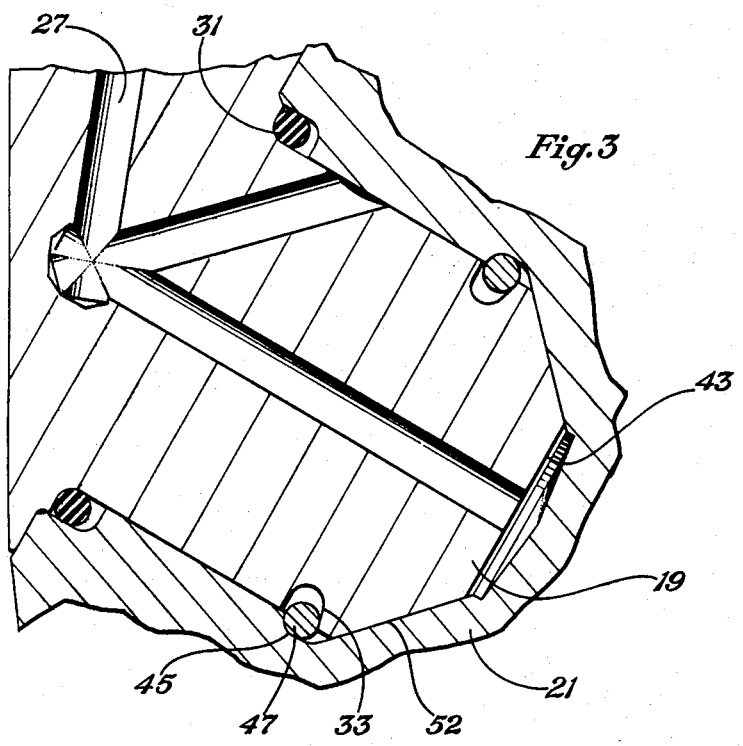
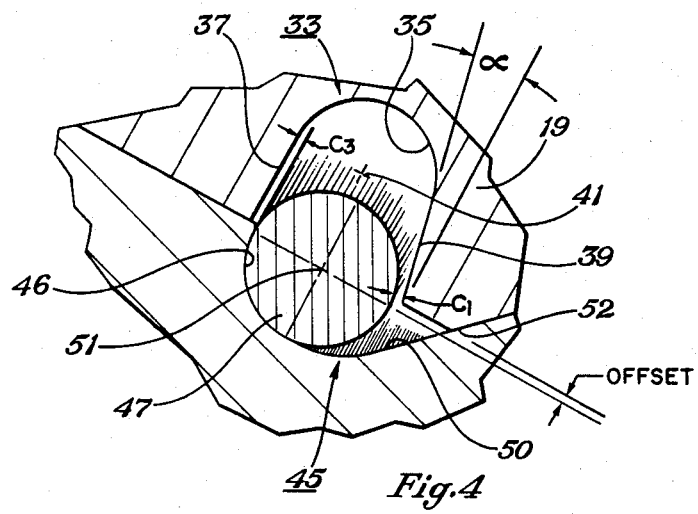

EARTH BORING DRILL BIT WITH SNAP RING CUTTER RETENTION

This is a division of application Ser. No. 174,483, filed Aug. 1, 1980, now U.S. Pat. No. 4,344,658, which is a continuation of application Ser. No. 008,504, filed Feb. 1, 1979, abandoned, which is a continuation of Ser. No. 846,643, filed Oct. 28, 1977, abandoned.

BACKGROUND OF THE INVENTION

1. Field of the Invention

This invention relates in general to earth boring drill bits and in particular to improved bearings and means for retaining the rotatable cutters on such bits.

2. Prior Art

The success of rotary drilling enabled the discovery of deep oil and gas reservoirs. The rotary rock bit was an important invention which made that success possible. Only the soft formations could be commercially pentrated with the earlier drag bit, but the two cone rock bit invented by H. R. Hughes, U.S. Pat. No. 939,759, drilled the hard cap rock at the Spindletop Field near Beaumont, Tex. with relative ease.

That distant invention, within the first decade of this century, could drill a scant fraction of the depth and speed of the modern rotary rock bit. If the original Hughes bit drilled for hours, the modern bit drills for days. Bits today sometime drill for miles instead of feet. Many improvements contributed to the impressive improvement in the performance of rock bits.

The original bit of Hughes had rotatable cutters, frictional bearing surfaces and ring-type retainers generally threaded for retention in the cutter. Because of the difficulty in providing seals with long life, relatively large lubricant reservoirs were required. By the decade of the thirties, drill bits with anti-friction bearing that were unsealed became commercially successful and replaced the sealed and lubricated drill bits. This type drill bit may be seen in the U.S. patent to Lewis E. Garfield et al, U.S. Pat. No. 2,030,442.

G. O. Atkinson et al obtained by U.S. Pat. No. 3,075,781 on a seal that mimimized leakage and required only a small reservoir of lubricant. The pressure compensator is an improvement that minimizes the pressure differential across the seal and increases its reliability. A recent version of the pressure compensator and pressure relief system is shown in the U.S. Patent of Stuart C. Millsapps, Jr., U.S. Pat. No. 3,942,596. E. M. Galle patented an O-ring type seal, U.S. Pat. No. 3,397,928, that ultimately made friction bearings once again feasible in drill bits. An illustration of a recent bearing configuration is shown in the U.S. Pat. No. 3,922,038 issued to S. R. Scales. This bit has a cylindrical, friction bearing and a cutter retained by a ball bearing similar to that shown in the above patent to Lewis E. Garfield et al.

A ball bearing in a lubricated rock bit bearing has inherent disadvantages. A failure in any one of the numerous balls may permit metallic fragments to enter the friction bearing, with near certain damaging results. Metallic particles will often damage the seal ring, causing lubricant loss and rapid bearing failure. The necessity for a hole drilled into the ball race for introduction of the balls, retained by a welded plug, adds complexity to the bit that provides additional room for manufacturing error. The rock bit is the focal point of an expensive drilling process that has a low tolerance for failure.

There is shown in the prior art rock bit bearing and retainer means that are totally frictional; that is, without anti-friction ball or roller bearings. The original Hughes bit had friction bearings exclusively. A few of the many bits with only frictional bearings will be mentioned briefly.

F. L. Scott in U.S. Pat. No. 1,803,679 discloses a lubricated, tapered frictional rock bit bearing that retains its cutter by means of a resilient snap ring. J. C. Wright et al in U.S. Pat. No. 2,049,581 discloses a cutter rotatably secured with a snap ring to a bearing shaft releasably connected to the legs or head sections of a bit. The U.S. Pat. No. 2,814,465 to W. G. Green discloses a lubricated frictional bearing having tapered and cylindrical portions joined by suitable means and secured to a cutter by a retainer ring. A lock ring is shown in Edward B. Williams, Jr.'s U.S. Pat. No. 3,844,363 for retaining a cutter and shaft with frictional bearings to a rock bit. A frictional bearing with tapered and cylindrical portions is disclosed by E. M. Galle in his U.S. Pat. No. 3,361,494, along with frictional plug lock and pin lock retaining systems. A recent revival of the earlier seen threaded ring retainer is seen in U.S. Pat. No. 3,971,600 of Murdoch et al. Notwithstanding this array of ideas, the only significantly successful rock bit in commerce today uses a ball bearing retainer.

The threaded retainer ring has some disadvantage that may have limited its success. The threads act as stress raisers and the ring must be secured against rotation while the cone is mated with it. This generally requires a drilled hole in the head section.

Snap rings may have stress raising groove configurations and exhibit a tendency to retract during drilling into the assembly groove and permit accidental cutter loss. When a cutter is thrust inward, as when reaming for example, the loading of the ring causes stresses that tend to urge the ring into the assembly groove, with the possibility of cutter loss.

SUMMARY OF THE INVENTION

The invention may be summarized as an improved friction bearing and snap ring retainer means for a rock bit of the type having rotatable cutters, with sealed and lubricated bearings and a pressure compensation system. The preferred snap ring is circular in cross section for assembly within two registering snap ring grooves, one in the cutter and the other in the bearing shaft that supports the cutter. The grooves in the preferred form have circular or semi-circular bottoms, one being an assembly groove of a depth at least as great as the cross-sectional thickness of the ring. The other groove, the retainer groove, has a depth less than the cross-sectional thickness of the ring. When the cutter is thrust outward (toward the wall of the bore hole), there is clearance between the ring and assembly groove, but when the cutter is thrust inward, the ring is confined between the assembly groove and the retainer groove. The ring is forced outward into the retainer groove by either the offset edge of the assembly groove or a tapered surface formed on the edge of the assembly groove, either of which produces a conical force distribution. This urges the ring into the retainer groove and prevents accidental displacement of the ring into the assembly groove and loss of the associated cutter. Further assurance of cutter retention is provided because the distance from the edge of the assembly groove to the opposing edge of the retainer groove is less than the thickness of the ring when the cone experiences thrust loading.

3

Additional objects, features and advantages of the invention will become apparent in the following description.

BRIEF DESCRIPTION OF THE DRAWINGS

FIG. 3 is an enlarged, fragmentary view in longitudinal section of a portion of the cutter and the bearing pin of FIG. 1.

FIG. 4 is a fragmentary view, in longitudinal section, of a region of the cutter and bearing pin around the cross-sectioned snap ring, of FIG. 1, the cutter being thrust outwardly on the bearing shaft.

DESCRIPTION OF THE PREFERRED EMBODIMENT

Figure 1:
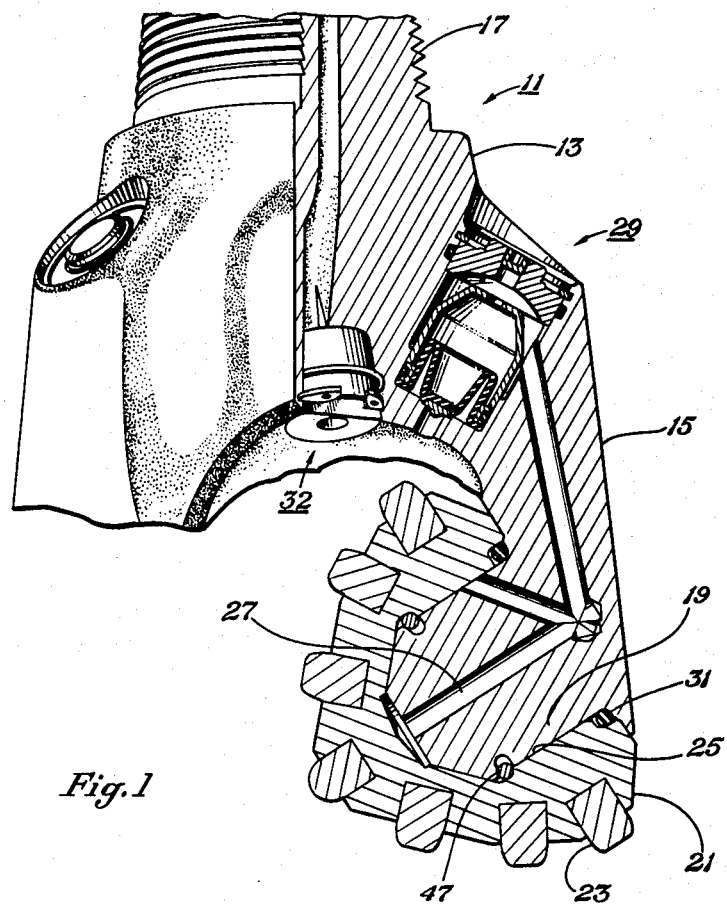
FIG. 1 is a fragmentary view, partially in section, of a rock bit which embodies the features of the invention.

Portions of an earth boring drill bit 11 are shown in FIG. 1, including a body 13 formed of three head sections 15 that are typically joined by a welding process. Threads 17 are formed on the top of body 13 for connection to a conventional drill string (not shown). Each head section 15 has a cantilevered shaft or bearing pin 19 having its unsupported end oriented inward and downwardly. A generally conically shaped cutter 21 is rotatably mounted on each bearing pin 19. Cutter 21 has earth disintegrating teeth 23 on its exterior and a central opening or bearing recess 25 on its interior for mounting on the bearing pin 19. Friction bearing means formed on the bearing pin 19 and cutter bearing recess 25 are connected with lubricant passages 27. (See U.S. Pat. Nos. 3,397,928 and 4,012,238 for bearing surface treatments.) A pressure compensator 29 and associated passages constitute a lubricant reservoir that limits the pressure differential between the lubricant and the ambient fluid which flows through the bit and its nozzle means 32. (See the copending application of Stuart C. Millsapps, Jr., Lubricant Pressure Compensator For An Earth Boring Drill Bit, Ser. No. 687,131, filed May 17, 1976 now U.S. Pat. No. 4,055,225). An O-ring seal 31 located between each bearing pin 19 and cutter 21 at the base of the bearing pin prevents egress of lubricant and ingress of borehole fluid. (See U.S. Pat. No. 3,397,928 for O-ring seal disclosure and U.S. Pat. No. 3,935,114 for lubricant.)

Figure 5:
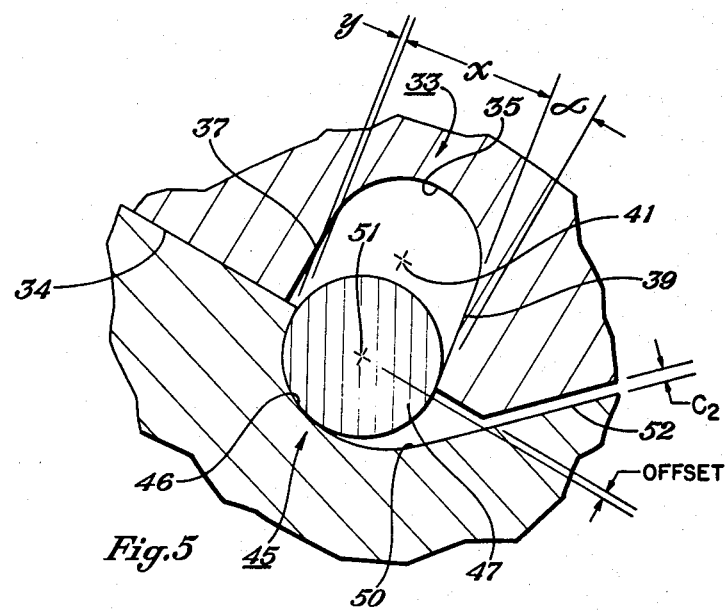
FIG. 5 is, like FIG. 4, a fragmentary view, in longitudinal section but with the cutter thrust inwardly on the bearing shaft.

Referring to FIGS. 3, 4 and 5, an annular assembly groove 33 is formed on the exterior, here cylindrical, surface 34 of the bearing pin 19. Groove 33 has a circular bottom portion 35 formed about a radius located on centerline 41. An outer and an inner sidewall designated respectively sidewall 37 or 39 extend from the semi-circular bottom portion 35 to the exterior surface of the bearing pin 19, outer sidewall 37 being the one farther from the inner end or nose 43 of the bearing pin 19. Outer sidewall 37 is planar and perpendicular to the coaxis (not shown) of the bearing pin 19 and cutter 21.

Inner sidewall 39 is a conical thrust surface nonperpendicular to the axis of the bearing pin, oriented at an angle α of preferably 15° with respect to a plane perpendicular to axis of the bearing pin. This produces an entrance to groove 33 larger than the diameter of its circular bottom portion 35 and is a beneficial thrust surface as will be explained subsequently.

A registering retainer groove 45 is formed in the bearing recess 25 of cutter 21. Groove 45 has sidewalls 46 and 50, with outer sidewall 46 located farthest from nose 43 of bearing pin 19. As seen in section, sidewall 46 has the form of a circular arc equal to one quarter of a circle, with a radius substantially equal to the radius of the bottom portion 35 of the previously described groove 33. The depth of groove 45 is greater than the radius of the circular arc. As seen in section in FIG. 4, inner sidewall 50 consists of a straight line connected at one end by means of a small radius with the quarter-circular arc of sidewall 46 and its other end extends to form one surface of a tapered or conical frictional nose bearing 52.

Figure 2:
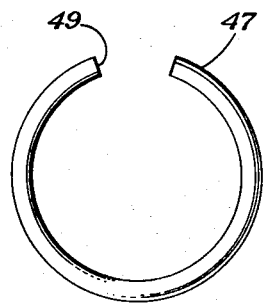
FIG. 2 is a full view of a snap ring used to rotatably retain the cutter on the bearing shaft or pin of the rock bit of FIG. 1.

Grooves 33 and 45 are located so that they register to define an irregularly shaped annular cavity. A snap ring 47 of circular cross-section is located in this cavity. It is formed of resilient metal, preferably piano wire, and contains a gap 49 (see FIG. 2) so that its annular diameter may be compressed or expanded. The annular diameter of ring 47 is selected so that it will expand tightly into groove 45 when relaxed. The cross-sectional diameter of 47 is substantially equal to the diameter of the circular portion 36 of groove 33.

The depth of assembly groove 33 is at least as large as the cross-sectional diameter of ring 47. This enables ring 47 to be stressed and retract fully into groove 33 for assembling cutter 21 over bearing pin 19. The depth of retainer groove 45 is greater than one-half the cross-sectional diameter of ring 47 but less than its full diameter. This depth is greater than the thickness of one-half the diameter of ring 47 by an amount, conveniently called the "offset", which in the preferred form is in the range from 0.005 inch to 0.020 inch. This places the cross-sectional centerline 51 of ring 47 outside the cylindrical surface 34 of the bearing pin and also outside the edge of the retainer groove by the same quantity.

To assemble the cutter 21 over bearing pin 19, a tool (not shown) is used to compress ring 47 into groove 33. The cutter 21 is then inserted partially over the bearing pin 19 and the tool removed. Cutter 21 is then forced outwardly and against the bearing pin until engagement of the opposing surfaces of the tapered nose bearing 52, as shown in FIG. 4. Groove 45 will be sufficiently aligned with groove 33 for ring 47 to snap into it. Ring 47 is shown in FIG. 4 against sidewall 46 of groove 45, and is not touching sidewall 50. Sidewall 39 of groove 33 also is separated from the ring by a clearance space $C_1$ to assure movement into retainer groove 45. The centerline 51 of ring 47 is offset to a position outside the surface 34 of the bearing pin 19 by the preferred distances of 0.005 to 0.020 inch.

Centerlines 41 and 51 do not lie on a common plane perpendicular to the bearing pin axis. Rather, centerline 51 is spaced closer to the nose 43 than centerline 41. Because of clearance $C_1$ the cutter 21 may move inward on bearing pin 19 to the position shown in FIG. 5. Here, ring 47 is confined between sidewall 46 of groove 45 and the corner of sidewall 39 of groove 33. A clearance $C_2$ appears between the opposing surfaces of conical or tapered thrust bearing 52.

The distnce from the offset annular edge of wall 39 of the assembly groove 33 to the opposite corner or outer wall 46 in retainer groove 45 is less than the thickness or diameter of snap ring 47 when the cutter is thrust inward to the position shown in FIG. 5. That is, the diameter of the snap ring in FIG. 5 is represented by the letter x+y. The distance from the edge of wall 39 to the opposite corner of groove 46 is a lesser distance x. Hence, when the cone is thrust inward, the ring cannot be retracted into the assembly groove 33 but must remain in the retainer groove 45 to prevent accidental cutter loss.

In operation, the most normal drilling condition produces outward thrust of cutter 21 on bearing pin 19 as seen in FIG. 4. No external forces are exerted on ring 47 due to engagement of the surfaces of tapered bearing 52 and the resulting clearance $C_1$ between the ring 47 and wall 39 of groove 33. If thrust on the cutter is inward, as sometimes occurs when reaming an undersized hole, the tendency will be for the cutter 21 to be pushed inwardly and from the bearing pin 19. This tendency will be resisted by ring 47, which transmits the thrust between sidewall 46 and sidewall 39 as shown in FIG. 5. Inner sidewall 39 serves as a thrust surface, providing a compressive reacting force.

The forming of inner sidewall 39 at an angle $\alpha$ generates a force component F (see FIG. 6) at the same angle $\alpha$ and in a direction oblique to the axis of rotation of the cutter 21. Thus, the configuration of the groove 33 produces a three dimensional conical force distribution F that expands the ring 47 outward into groove 45 in cutter 21. This prevents compression of ring 47 into the groove 33 of bearing pin 19 and the consequent loss of cutter 21.

Figure 6:
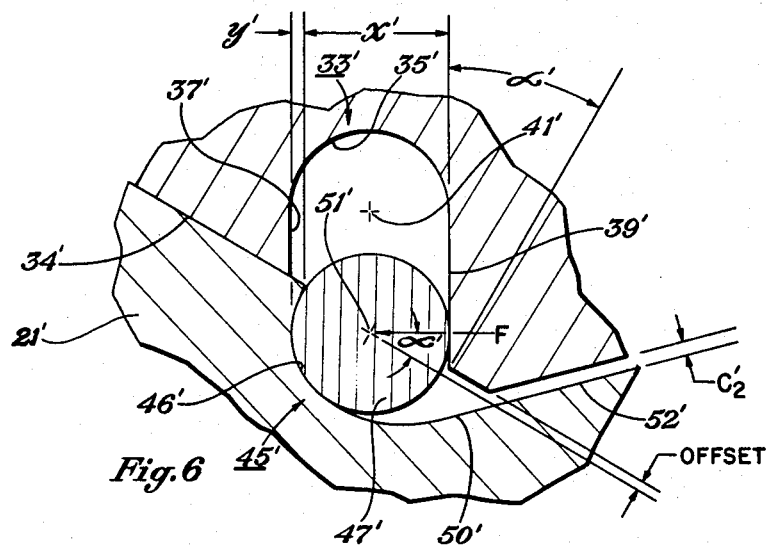
FIG. 6 is a fragmentary view, in longitudinal section, of a second construction with the cutter thrust inward.

FIG. 6 is a second construction from that shown in FIGS. 4 and 5 in that the walls 37,37', 39 39' of assembly groove 33$\alpha$' are parallel and formed at the angle $\alpha$. The "offset" is smaller in FIG. 6 and is not necessarily utilized since here the tapered wall 39, 39' exerts a force component F normal to the surface of ring 47, 47' to urge the ring into retainer groove 45, 45'.

Figure 7:
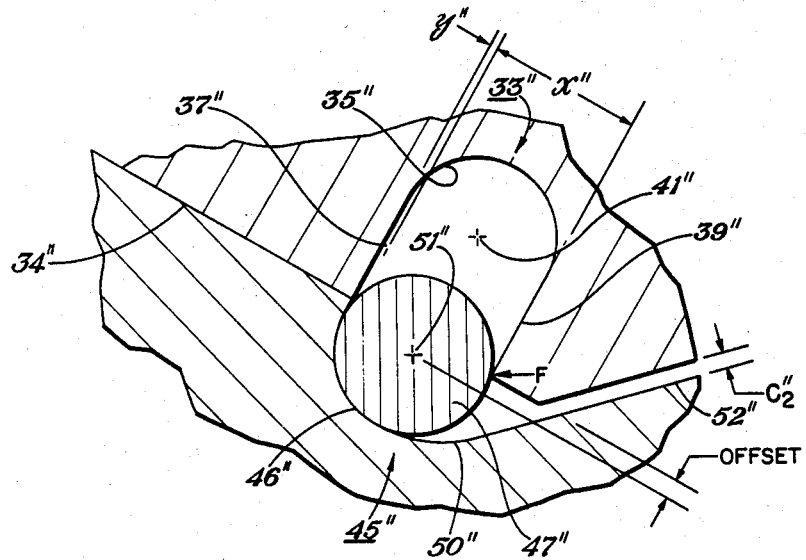
FIG. 7 is a fragmentary view, in longitudinal section, of a third construction, with the cutter thrust inward.

In FIG. 7 is shown a third construction in which the walls 37, 37'', 39, 39'' of assembly groove 33, 33'' are parallel and perpendicular the centerline of the bearing pin. Here the edge or outer wall 39, 39'' of groove 33 engages the ring 47, 47'' at a distance from the centerline 51, 51'' of the ring 47, 47'' equal to the "offset" from cylindrical bearing surface 34, 34''. A force component F is exerted obliquely against the ring, at an angle normal to the surface of ring 47, 47'', to urge the ring into the retainer groove 45, 45'' when the cone is thrust inward.

The preferred construction of FIGS. 4 and 5 is a combination of the features of FIGS. 6 and 7 in that wall 39 (but not wall 37) of groove 33 is tapered and the "offset" feature is also used. The quantity of offset in the specified preferred range is such that angle $\alpha$ of preferably 15° results in surface 39 contact with the ring rather than sharp edge contact. This provides a superior wear condition since a sharp edge will wear the ring more rapidly.

Each of the three constructions of FIG. 4 through 7 have a feature that further minimizes loss of a cutter, as previously explained in connection with FIG. 5. That is, the cross-sectional thickness x+y of the ring 47 is greater than the distance x from the edge of wall 39 to the opposite corner of groove 46 when the cutters are thrust inwardly on their bearing shafts.

It should be apparent from the foregoing that improvements having significant advantages have been made. The utilization of a bearing structure which consists of lubricated frictional bearing surfaces, including a frictional retainer means, simplifies construction and increases reliability. The utilization of the disclosed snap ring and groove configuration minimizes the danger of loss of the cutter. The previously described offset position between the centerline of the ring and the surface of the bearing near the assembly groove results in an oblique force component that urges the ring into its retainer groove. The smooth angular thrust surface in the assembly groove to engage the ring when the cone is thrust inward provides an advantageous wear environment. Further, the oblique orientation of this surface, which acts as a thrust surface, also urges the retainer ring into its retaining groove when the cone is thrust inward. The ring configuration and thickness being lesser than the distance across the groove assures cutter retention.

While the invention has been shown in only one of its forms, it should be apparent to those skilled in the art that it is not thus limited but is susceptible to various changes and modifications without departing from the spirit thereof.

We claim:

1. In combination with an earth boring bit having at least one cantilevered bearing shaft rotatably supporting a cutter, an improved cutter retention means comprising in combination:

exclusively friction bearing means between said cutter and shaft, including an inwardly facing thrust surface on the shaft to engage a mating thrust surface in the cutter;

a lubrication system to provide lubricant to the friction bearing means;

seal means between the bearing shaft and rotatable cutter to retain lubricant;

pressure compensator means connected with the lubrication system;

one of said cutter and shaft having an assembly groove with inner and outer sidewalls and the other having a registering, retainer groove with inner and outer sidewalls;

a snap ring positioned in said grooves;

the retainer groove having a depth less than the cross-sectional thickness of the ring;

the assembly groove having a depth at least equal to the cross-sectional thickness of the ring;

a clearance formed between the snap ring and at least one sidewall of the assembly groove when said thrust surfaces of the cutter and shaft are engaged, whereby the snap ring may be easily assembled and also isolated during drilling from outward thrust loading.

2. In combination with an earth boring bit having at least one cantilevered bearing shaft rotatably supporting a cutter, an improved cutter retention means comprising in combination:

exclusively friction bearing means between said cutter and shaft, including an inwardly facing thrust surface on the shaft to engage a mating thrust surface in the cutter;

a lubrication system to provide lubricant to the friction bearing means;

seal means between the bearing shaft and rotatable cutter to retain lubricant;

pressure compensator means connected with the lubrication system;

one of said cutter and shaft having an assembly groove and the other having a registering, retainer groove, both with inner and outer sidewalls;

a snap ring positioned in said grooves;

the retainer groove having a depth less than the cross-sectional thickness of the ring;

the assembly groove having a depth at least equal to the cross-sectional thickness of the ring;

a clearance between the snap ring and the inner sidewall of the assembly groove when said thrust surfaces are engaged;

a second clearance between the snap ring and at least a selected one of the inner sidewall of the retainer groove and the outer sidewall of the assembly groove;

whereby the snap ring may be easily assembled and isolated from outward thrust loading.

3. In combination with an earth boring bit having at least one cantilevered bearing shaft rotatably supporting a cutter, an improved cutter retention means comprising in combination:

exclusively friction bearing means between said cutter and shaft, including an inwardly facing thrust surface on the shaft to engage a mating thrust surface in the cutter;

a lubrication system to provide lubricant to the friction bearing means;

seal means between the bearing shaft and rotatable cutter to retain lubricant;

pressure compensator means connected with the lubrication system;

said shaft having an assembly groove and said cutter having a registering retainer groove;

a snap ring positioned in said grooves;

the retainer groove having a depth greater than one-half but less than the full cross-sectional thickness of the ring;

the assembly groove having a depth at least equal to the cross-sectional thickness of the ring;

a clearance between the snap ring and the inner sidewall of the assembly groove when said thrust surfaces are engaged;

a second clearance between the snap ring and the inner sidewall of the retainer groove;

a third clearance between the snap ring and the outer sidewall of the assembly groove;

whereby the snap ring may be easily assembled and isolated from outward thrust loading.

4. In combination with an earth boring bit having at least one cantilevered bearing shaft rotatably supporting a sealed and lubricated cutter, an improved cutter retention means comprising:

exclusively friction bearing means between said cutter and shaft, including thrust surfaces and cylindrical surfaces;

one of said cutter and shaft having in a cylindrical surfaces an assembly groove with inner and outer sidewalls and the other having a registering, retainer groove with inner and outer sidewalls;

a snap ring with a portion that opposes the inner sidewall of the assembly groove;

the retainer groove having a depth greater than one-half but less than the full cross-sectional thickness of the ring such that an annular edge formed by the inner sidewall of the assembly groove and the adjacent cylindrical surface is positioned adjacent said portion of the snap ring when the cutter is assembled on the shaft;

the assembly groove having a depth at least equal to cross-sectional thickness of the ring to receive the ring and permit assembly of the cutter over the shaft;

a clearance between the snap ring and one inner sidewall of the assembly groove;

a second clearance between the snap ring and a selected outer sidewall of the retainer groove and the assembly groove;

whereby the snap ring may be easily assembled and isolated from outward thrust loading.

5. The invention defined by claim 4 wherein the assembly groove is formed in the shaft and the retainer groove is formed in the cutter.

6. The invention defined by claim 4 wherein the shortest distance across the registering assembly and retainer grooves, measured across the opening of the registering grooves, is less than the cross-sectional thickness of the snap ring located in the retainer groove, measure across said opening, when the cutter is thrust inward.

7. The invention defined by claim 6 wherein the assembly groove is formed in the shaft and the retainer groove is formed in the cutter.

8. In combination with an earth boring bit having at least one catilevered bearing shaft rotatably supporting a sealed and lubricated cutter, an improved cutter retention means comprising:

exclusively friction bearing means between said cutter and shaft, including thrust surfaces and radial load surfaces;

the shaft having in a radial load surface an assembly groove with inner and outer sidewalls and the cutter having a registering, retainer groove with inner and outer sidewalls;

a snap ring with an inner, smaller portion that opposes the inward sidewall of the assembly groove when assembled with the cutter and shaft;

the retainer groove having a depth greater than one-half but less than the full cross-sectional thickness of the ring such that an annular edge formed by the inner sidewall of the assembly groove and the adjacent radial load surface is positioned adjacent said portion of the snap ring when the cutter is assembled on the shaft;

the assembly groove having a depth at least equal to cross-sectional thickness of the ring to receive the ring and permit assembly to the cutter over the shaft;

a clearance formed between the snap ring and the inner sidewall of the assembly groove and a clearance between the snap ring and a selected one of the inner sidewall of the retainer groove and the outer sidewall of the assembly groove, when said thrust surface of the cutter and shaft are engaged, whereby the snap ring may be easily into assembled and also isolated during drilling from outward thrust loading;

the shortest distance across the registering assembly and retainer grooves when said thrust surfaces are engaged being less than the maximum cross-sectional thickness of the ring in the retainer groove.

9. The invention defined by claim 8 wherein said inner, smaller portion of the ring has a curved configuration.

* * * * *